United States Patent
Inaba (12)

(10) Patent No.: US 6,547,403 B2
(45) Date of Patent: Apr. 15, 2003

(54) STEREO SLIDE MOUNT AND STEREO SLIDE VIEWER

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

(21) Appl. No.: 09/809,786

(22) Filed: Mar. 16, 2001

(65) Prior Publication Data

US 2002/0131019 A1 Sep. 19, 2002

(51) Int. Cl.$^7$ ................................................ G03B 21/00
(52) U.S. Cl. ............................ 353/120; 353/7; 359/473
(58) Field of Search ................................ 353/120, 7, 9; 359/466–469, 473, 477; 40/701, 706

(56) References Cited

U.S. PATENT DOCUMENTS

| | | | |
|---|---|---|---|
| 2,292,312 A | 8/1942 | Wittel et al. | |
| 2,739,401 A | 3/1956 | Balter | |
| 2,823,478 A | 2/1958 | Ostergaard et al. | |
| 2,842,883 A | 7/1958 | Folwell et al. | |
| 3,133,368 A | 5/1964 | Perrot | |
| 3,235,991 A | 2/1966 | Harper et al. | |
| 3,242,605 A | 3/1966 | Kleinschmidt | |
| 3,389,485 A | 6/1968 | Roubal | |
| 3,808,722 A | 5/1974 | Byers et al. | |
| 3,980,394 A | * 9/1976 | Zapf | ........................ 359/473 |
| 4,104,818 A | 8/1978 | Hrabik | |
| 4,132,480 A | 1/1979 | Reed | |
| 4,314,416 A | 2/1982 | Lorsch | |
| 4,431,282 A | 2/1984 | Martin geb. Boser | |
| 5,392,548 A | 2/1995 | Truc et al. | |
| 5,685,626 A | * 11/1997 | Inaba | ........................ 353/120 |
| 5,879,064 A | 3/1999 | Inaba | ............................ 353/7 |
| 5,947,575 A | 9/1999 | Inaba | ............................ 357/9 |
| 6,296,360 B1 | * 10/2001 | Inaba | ........................ 353/120 |

\* cited by examiner

Primary Examiner—David M. Gray
Assistant Examiner—Michelle Nguyen
(74) Attorney, Agent, or Firm—Fattibene & Fattibene; Paul A. Fattibene; Arthur T. Fattibene

(57) ABSTRACT

A stereo slide mount and a stereo slide viewer in which a pair of right and left film holders are adjusted in either a direction of separation or a direction of approach by a film pitch-adjusting device to enhance the operability. A stereo slide mount in which a guide groove (3b) extending in the right-and-left direction is formed in the surface of a base frame (3) in which right and left windows are formed, a pair of right and left film holders, each having a window (6) and film-positioning pins (10) for engagement with the film (F), are provided in said guide groove (3b) to freely slide therein, and a cover frame having right and left windows formed therein is detachably attached to said base frame (3) to hold said film holders (32), wherein recessed grooves (33) are symmetrically formed in an inclined manner in the surfaces near the opposing ends of said pair of right and left film holders (32) so as to come in mesh with helical engaging portions of a film pitch-adjusting device provided in a stereo slide viewer.

10 Claims, 15 Drawing Sheets

STEREO SLIDE MOUNT AND STEREO SLIDE VIEWER

BACKGROUND OF THE INVENTION

1. Field of the Invention

The present invention relates to a stereo slide mount and a stereo slide viewer. More particularly, the invention relates to a stereo slide mount in which the film pitch between a right film holder and a left film holder slidably mounted in the stereo slide mount is allowed to be adjusted in either a direction of approach or a direction of separation, and to a stereo slide viewer.

2. Prior Art

The present applicant has already proposed a stereo slide mount and a stereo slide view of this kind in an application (Japanese Patent Application No 273315/1999) which will now be described with reference to FIGS. 8(a–g), 9–11, 12(a,b), 13 and 14.

FIGS. 8(a–g) illustrates a cover frame 1, two pieces of right and left film holders 2, 2, and a base frame 3 for constituting a stereo slide mount, that are all molded by injecting a resin, and wherein FIG. 8(a) illustrates a back surface of the cover frame 1 that comes into contact with the base frame 3.

In the base frame 3 and the cover frame 1 are formed right and left windows 5L, 5R and 4L, 4R. Windows 6, 6 are also formed in the two pieces of right and left film holders 2, 2 that are sandwiched by the base frame 3 and the cover frame 1.

A guide groove 3b extending toward the right and left is formed in an intermediate portion between an upper edge and a lower edge of the base frame 3 shown in FIGS. 8(f) and 8(g). The vertical width of the bottom surface of the guide groove 3B is wider than the gap between the upper and lower edges 3a, 3a of the base frame 3 thereby to form a dovetail groove, and plural pins 7 are stud on the upper end lower edges 3a.

Pin holes 8 are perforated in both the upper and lower edges of the cover frame 1 so as to be fitted to the pins 7 of the base frame 3. When the cover frame 1 is placed on the base frame 3 in a manner that the pins 7 are fitted to the pin holes 8, then, the base frame 3 and the cover frame 1 are coupled together.

The base frame 3 in which the dovetail groove is formed constitutes a fitting pair together with the film holders 2 and 2 of a trapezoidal shape in cross section shown in FIG. 8(e), enabling the film holders 2 and 2 fitted into the base frame 3 to be slid in the right-and-left direction.

Stopper pins 9 are provided on the inner sides of the right and left windows 5R and 5L of the base frame 3. When two pieces of the right and left film holder 2 are slid in a direction to approach each other until they come in contact with the stopper pins 9 then, the pitch between the windows 6 and 6 of the two pieces of the film holders 2 is determined to be the shortest in a range of adjusting the film pitch.

Referring next to FIGS. 8(c) and 8(d), the two pieces of right and left film holders 2 have a pentagonal shape with their vertical sides on one side protruding in a V-shape. The film holders 2 are mounted on the base frame 3 with their V-shaped vertical sides being opposed to each other. Film-positioning pins 10 are stud on the upper and lower portions of the windows 6 and 6 of the film holders 2 to serve as engaging portions for positioning the right and left two films. When the perforations of the films are brought into engagement with the film-positioning pins 10, the pictures on the films are brought into agreement with the windows 6 and 6 of the film holders 2.

Recesses 11 are formed in the back surface of the cover frame 1 to avoid interference with the film-positioning pins 10 of the film holders 2. The film holders 2 on the base frame 3 are allowed to freely slide in the right-and-left direction within a predetermined range in a state where the cover frame 1 is mounted on the base frame 3.

FIG. 9 illustrates a stereo slide viewer 12, wherein a pair of right and left eyepieces 14R and 14L are arranged in front of a groove-shaped slide mount holder unit 13, and an illumination bulb 15 and an arcuate reflector 16 are arranged at the back of the slide mount holder unit 13 so that, when the illumination bulb 15 is turned on, the back surface of the slide mount holder unit 13 is irradiated with light due to the reflector 16. Further, eyepiece holders 17R and 17L of the right and left eyepieces 14R and 14L, are so constructed that the distance between the optical axes can be adjusted and the focal points in the direction of the optical axis can be adjusted, too.

A leaf spring 13b is provided on a front wall surface 13a in the slide mount holder unit 13. The stereo slide mount in the slide mount holder unit 13 is positioned being press-contacted to a rear wall surface 13c on the side of the eyepieces 14R and 14L due to the leaf spring 13b.

Further, a film pitch-adjusting device 18 is disposed between the right and left eyepieces 14R and 14L. The film pitch-adjusting device 18 works to adjust the gap between the right and left film holders 2 and 2 of the stereo slide mount by turning helical cams 19R and 19L.

Referring to FIG. 10, the pair of right and left helical cams 19R and 19L have a D-shape in cross section with their outer peripheral surfaces of disks being partly cut straight. Referring to FIG. 11, the helical cams 19R and 19L have helicoidal cam surfaces 20R and 20L on the outer side surfaces thereof, the right cam surface 20R and the left cam surface 20L being symmetrical to each other.

The pair of right and left helical cams 19R and 19L are fitted to a cam shaft 22 holding a spur gear 21 therebetween. The right and left ends of the cam shaft 22 are supported by bracket bearings 23 shown in FIG. 10 provided in the viewer frame of the stereo slide viewer 12. A pinion shaft 24 is arranged under the cam shaft 22 in parallel therewith, and a pinion 25 fitted to the pinion shaft 24 is in mesh with the spur gear 21. When a knob 26 shown in FIG. 9 attached to an end of the pinion shaft 24 is turned, the helical cams 19R and 19L rotate.

FIG. 12 illustrates a collimation pattern mask 27 which enables an optimum pitch to be easily recognized in adjusting the film pitch of the stereo slide mount by using the stereo slide viewer 12. The collimation pattern mask 27 has a shape similar to the cover frame 1, and portions other than the right and left transparent windows 28R and 28L are coated with a light-shielding coating material or are formed of a colored resin, so that no light passes therethrough. A square window 29 is perforated in the central portion.

The sizes and positions of the transparent windows 28R and 28L, pin holes 30 formed in the collimation pattern mask 27, and recesses 31 are the same as those of the cover frame 1. The same collimation patterns CP comprising chiefly plural vertical lines are printed on the back surfaces (that come in contact with the films) of the transparent windows 28R and 28L.

Next, described below is a procedure of operation for mounting the film and for adjusting the film pitch 1. Referring to FIG. 13, two pieces of right and left film holders 2 are mounted on the base frame 3, are brought to be the closest to each other, and films F and F are mounted on the film holders 2.
2. Referring to FIG. 14, the collimation pattern masks 27 are mounted on the base frame 3.
3. Next, the base frame 3 on which the collimation pattern mask 27 is mounted is inserted in the slide mount holder unit 13 of the stereo slide viewer 12 shown in FIG. 9.
4. Perspective feeling of a picture is observed relative to the image of the collimation patterns OP of the collimation pattern mask 27 in a three-dimensional view through the eyepieces 14R and 14L of the stereo slide viewer 12. In a state where the picture is seen in flush with the collimation patterns OP or is seen at the back of the collimation patterns OP. the film pitch of the stereo slide mount is proper, and the film pitch needs not be adjusted. In this case, the stereo slide mount is taken out from the stereo slide viewer 12, the collimation pattern mask 27 is removed from the base frame 3 and, instead, the cover frame 1 is mounted to complete the mounting operation.
5. When the film pitch is not proper, the knob 26 of the stereo slide viewer 12 is turned to adjust the film pitch. When the knob 26 is turned counterclockwise, the helical cams 19R and 19L rotate from the initial position, and the ends of the cam surfaces 20R and 20L enter into between the two pieces of film holders 2. The cam surfaces 20R and 20L come in contact with the apexes of the vertical sides on the inner sides of the film holders 2 to push them outward, so that the gap increases between the two pieces of film holders 2.

In this case, the outer edges of the pictures of the films are masked over increased areas by the edges of the windows 28R and 28L of the collimation pattern mask 27, and the distance of the three-dimensional picture moves back away beyond the images of the collimation patterns CP. An optimum film pitch is accomplished when the three-dimensional picture is seen in flush with the collimation patterns CP or is seen at the back of the collimation patterns CP. In this case, the knob 26 is turned reverse to return the helical cams 19R and 19L to the initial positions. At this moment, the film holders 2 and 2 are held at the positions of an optimum film pitch.

Further, the stereo slide mount is taken out from the stereo slide viewer 12, the collimation pattern mask 27 is removed from the base frame 3 and, instead, the cover frame 1 is mounted to complete a stereo slide mount having an optimum film pitch.

The completed stereo slide mount can be appreciated by being mounted on the slide mount holder unit 13 of the stereo slide viewer 12. Even when the knob 26 is turned during the appreciation, the film holders 2 are shielded by the cover frame 1; i.e., the helical cams 19R and 19L do not come in contact with the film holder 2, and the film pitch does not vary.

When the film pitch being adjusted becomes excessive passing through the optimum pitch and the three-dimensional picture is seen very farther than the collimation patterns CP, the film pitch must be adjusted again. In this case, the 26 is turned reverse to return the helical cams 19R and 19L to the initial positions, the stereo slide mount is taken out from the stereo slide viewer 12, the right and left film holders 2 are slid to the positions where they are closest to each other, the stereo slide mount is loaded again, and the knob 26 is turned to adjust the film pitch again.

In the above-mentioned stereo slide mount and in the stereo slide viewer, the film pitch-adjusting device 18 is capable of adjusting the pitch in one direction only, i.e., in only a direction in which the film holders 2 and 2 separate away from each other, and the film holders 2 and 2 are not adjusted in a direction to approach each other despite the knob 26 is turned reverse, accompanied by such a problem in operation that when a proper film pitch value is exceeded, the stereo slide mount must be taken out from the stereo slide viewer 12, the right and left film holders 2 and 2 must be adjusted to the positions that are closest to each other, and the stereo slide mount must be loaded again in the stereo slide viewer 12 to adjust the film pitch again.

In the stereo slide mount and stereo slide viewer, therefore, there arises a technical assignment that must be solved for enhancing the operability by adjusting the pair of right and left film holders in either the direction of separation or the direction of approach by using the film pitch-adjusting device.

SUMMARY OF THE INVENTION

It is therefore an object of the present invention to solve the above technical assignment.

The present invention was proposed in order to achieve the above object, and provides:

a stereo slide mount in which a guide groove extending in the right-and-left direction is formed in the surface of a base frame in which right and left windows are formed, a pair of right and left film holders, each having a window and an engaging portion for engagement with the film, are provided in said guide groove to freely slide therein, and a cover frame having right and left windows formed therein is detachably attached to said base frame to hold said film holders, wherein meshing portions are symmetrically formed on the surfaces near the opposing ends of said pair of right and left film holders so as to come in mesh with helical engaging portions of a film pitch-adjusting device provided in a stereo slide viewer;

a stereo slide mount in which the meshing portions formed on the pair of right and left film holders are recessed grooves that are symmetrically provided in an inclined manner;

a stereo slide mount in which the meshing portions formed on the pair of right and left film holders are recessed grooves that are formed in the shape of a hyperbola;

a stereo slide mount in which the meshing portions formed on the pair of right and left film holders are recessed grooves that are formed in the shape of a character X;

a stereo slide mount in which the meshing portions formed on the pair of right and left film holders are protuberances formed in a protruded manner on the surfaces of the film holders;

a stereo slide mount in which the meshing portions formed on the pair of right and left film holders are a pair of protuberances formed in a protruded manner on the surfaces of the film holders maintaining a predetermined gap;

a stereo slide viewer comprising right and left eyepieces and a slide mount holder unit for loading a stereo slide mount, wherein a film pitch-adjusting device is provided at an intermediate portion between the right and left eyepieces of the stereo slide viewer but outside the visual fields of the right and left eyepieces for adjusting the gap between a pair of right and left film holders in said stereo slide mount, said film pitch-adjusting device having a pair of helical engaging portions in a right-and-left symmetrical manner;

a stereo slide viewer in which the helical engaging portions are worm;

a stereo slide viewer in which the helical engaging portions are helical grooves; and a stereo slide viewer comprising right and left eyepieces and a slide mount holder unit for loading a stereo slide mount, wherein a film pitch-adjusting device is provided at an intermediate portion between the right and left eyepieces of the stereo slide viewer but outside the visual fields of the right and left eyepieces for adjusting the gap between a pair of right and left film holders in said stereo slide mount, said slide mount holder unit being provided with a mount holder plate that freely slides back and forth holding the stereo slide mount.

DESCRIPTION OF THE PREFERRED EMBODIMENTS

Figure 1:
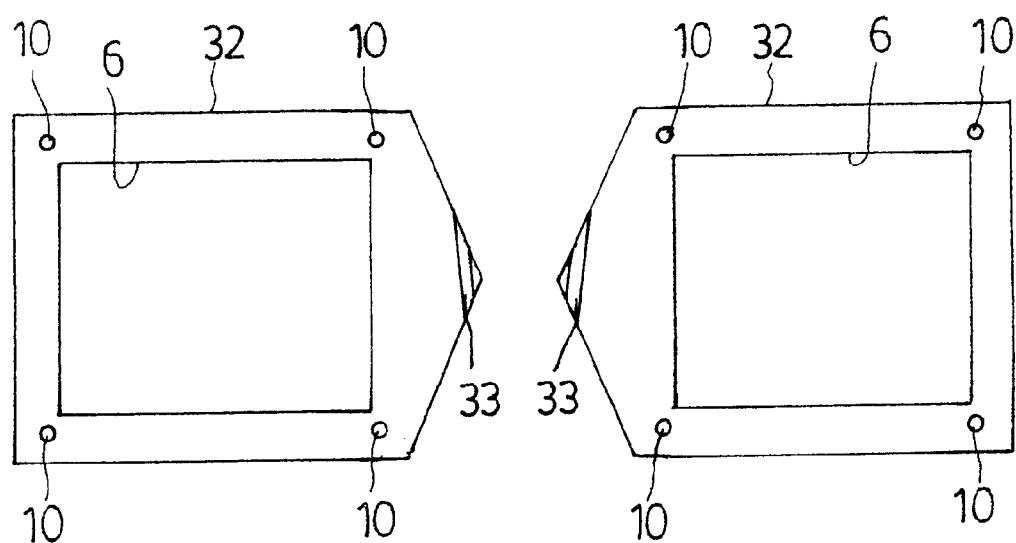
FIG. 1 is a front view of a pair of right and left film holders according to an embodiment of the present invention.

An embodiment of the invention will now be described in detail with references to FIGS. 1 to 7. For easy explanation, the same constituent portions as those of the prior art are denoted by the same reference numerals but their description is not repeated. In FIG. 1, reference numeral 32 denote a pair of right and left film holders. The film holders 32 are the ones same as the film holders 2 in FIGS. 8(c–e) of the prior art but having recessed grooves 33 which are meshing portions formed in the surfaces near the V-shaped vertical sides to mesh with helical engaging portions of a film pitch-adjusting device that will be described later. Here, the angles subtended by the V-shaped vertical sides for forming the recessed grooves 33 are suitable adjusted.

The recessed grooves 33 and 33 are formed in an equal width, the recessed groove 33 formed in the left film holder 32 being inclined toward the right lower side and the recessed groove 33 formed in the right film holder 32 being inclined toward the left lower side.

Figure 2:
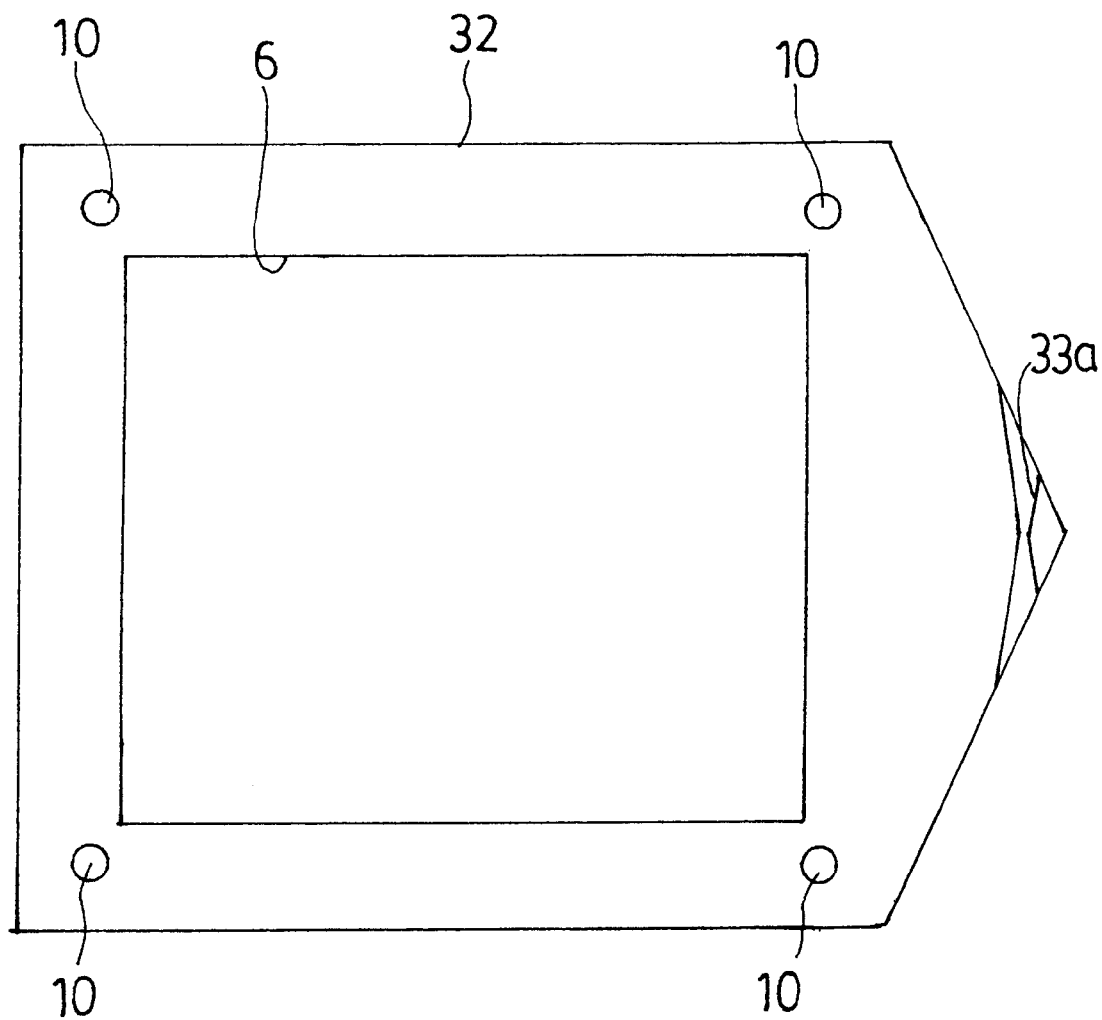
FIG. 2 is a front view of a film holder according to another embodiment of the present invention.
Figure 2A:
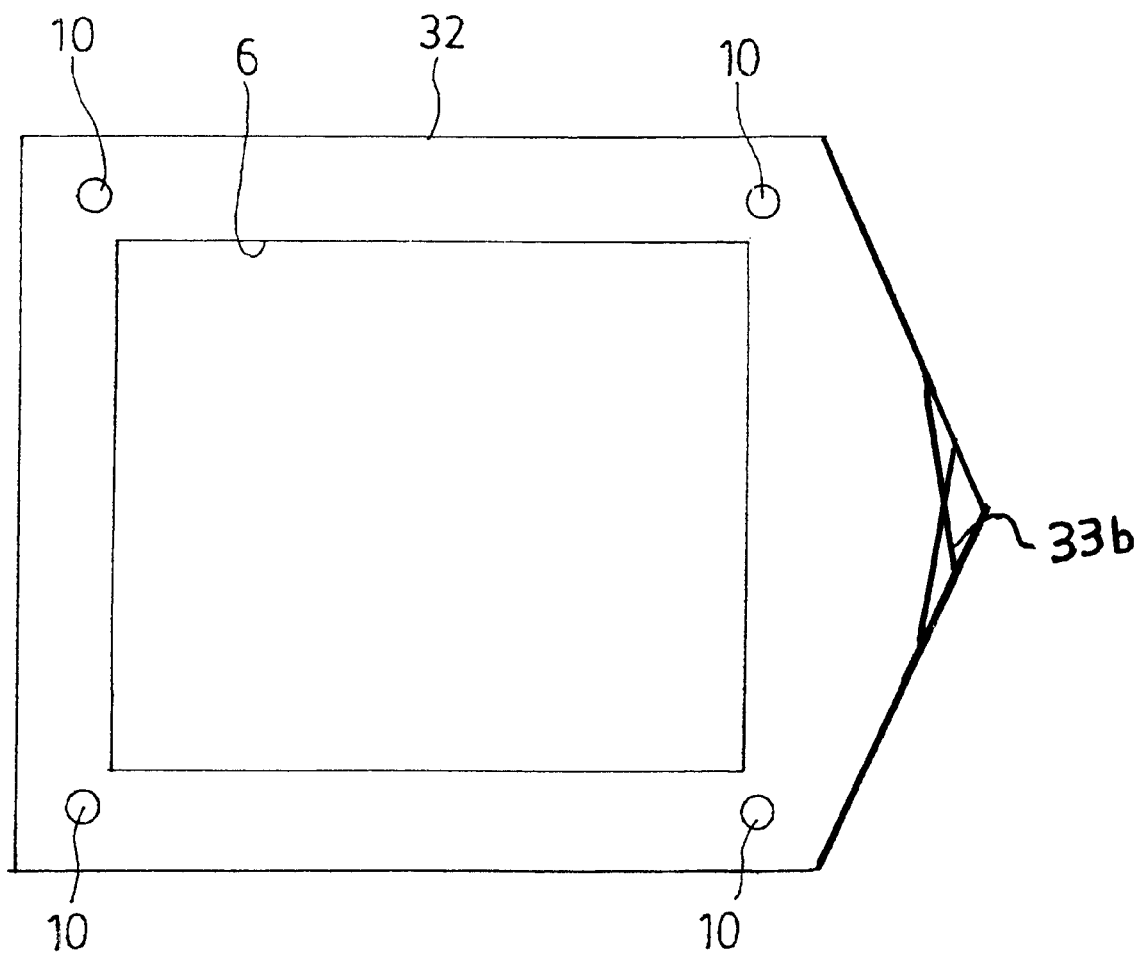
FIG. 2a is a front view of a film holder according to another embodiment of the present invention.

The recessed groove 33 is common to both the right and left film holders 32 and 32. As shown in FIG. 2, however, the recessed groove 33a may be formed in the shape of a hyperbola or may be formed in an X-shape illustrated at 33b in FIG. 2a or may be formed having a pair of protuberances protruding maintaining a predetermined gap.

Figure 3:
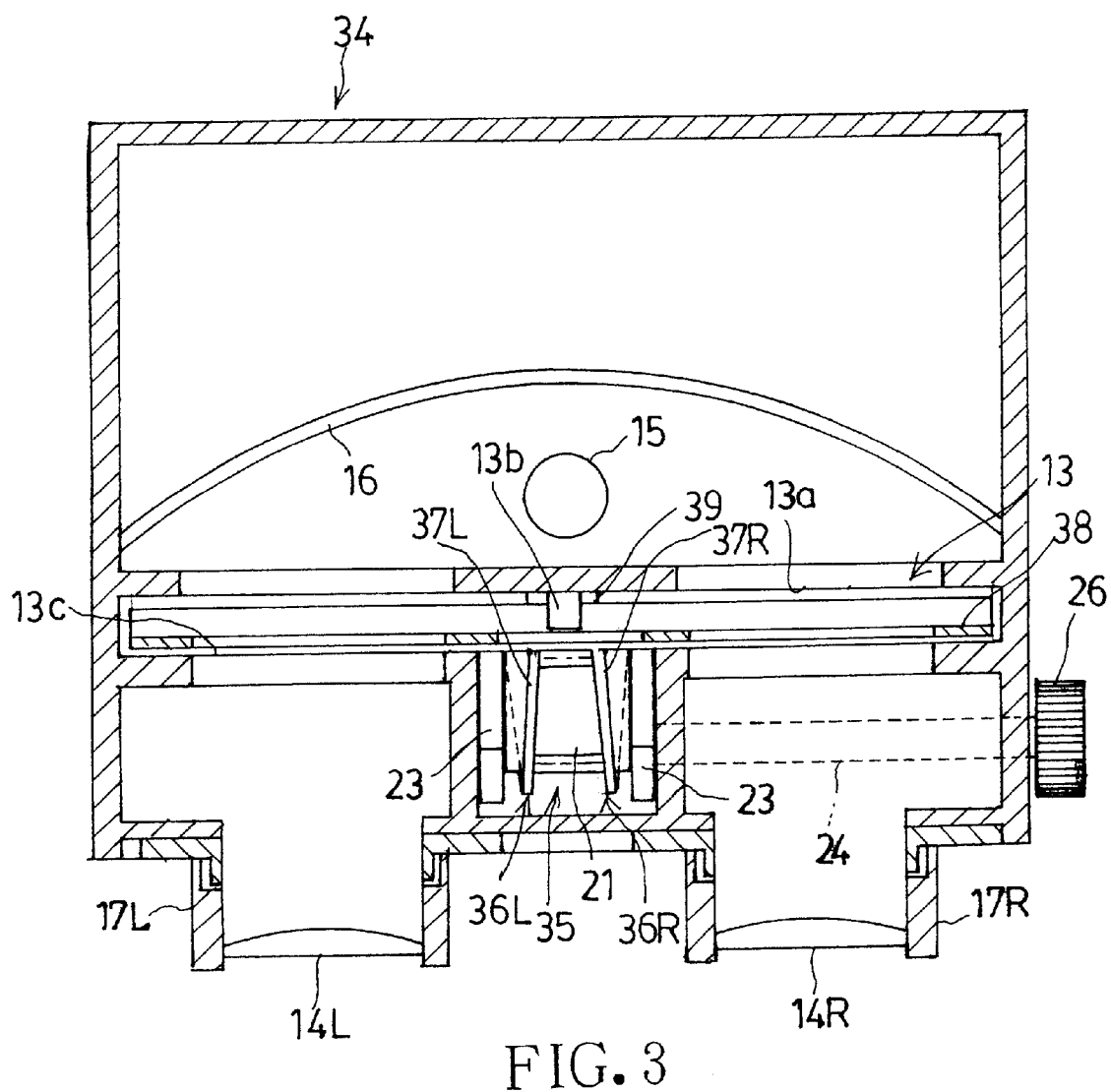
FIG. 3 is a partly cut-away plan view of a stereo slide viewer according to an embodiment of the present invention.
Figure 4:
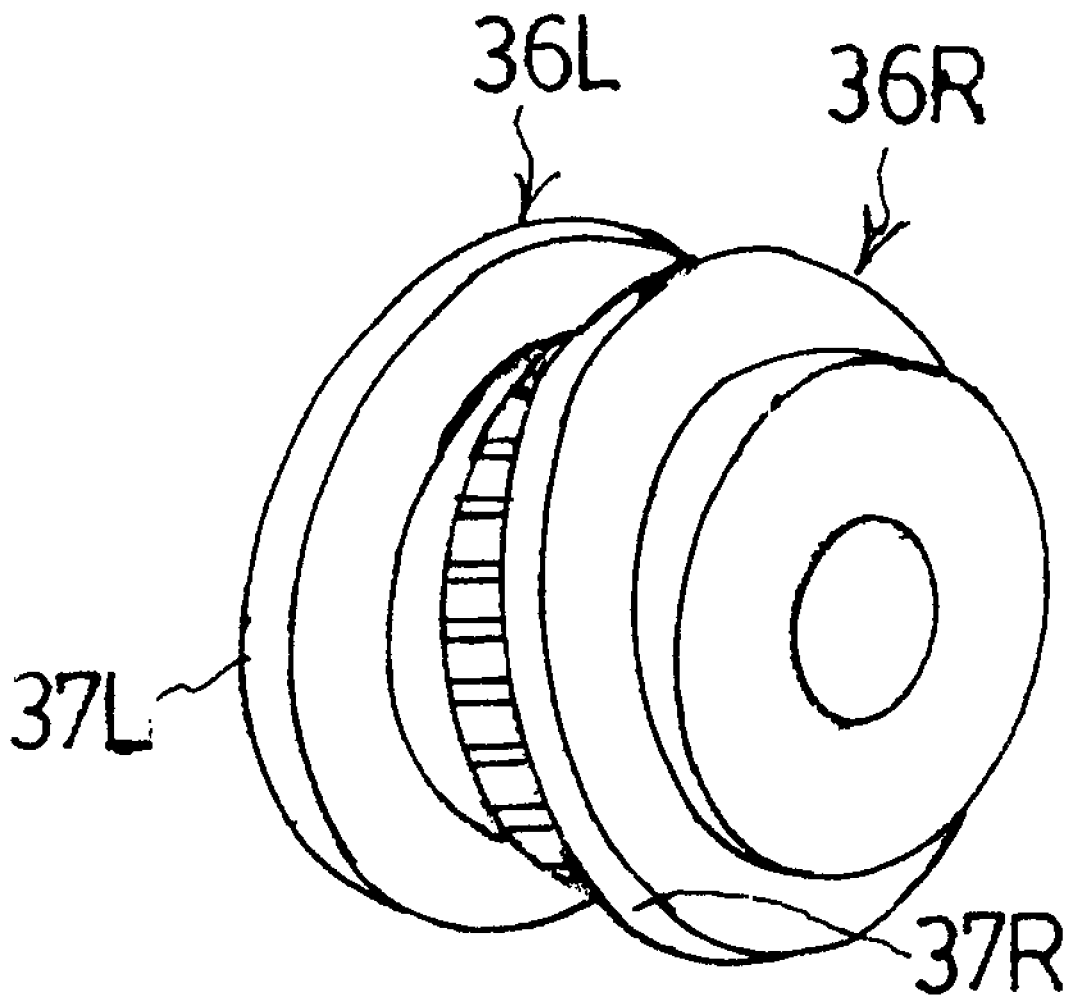
FIG. 4 is a perspective view of worm according to an embodiment of the present invention.
Figure 9:
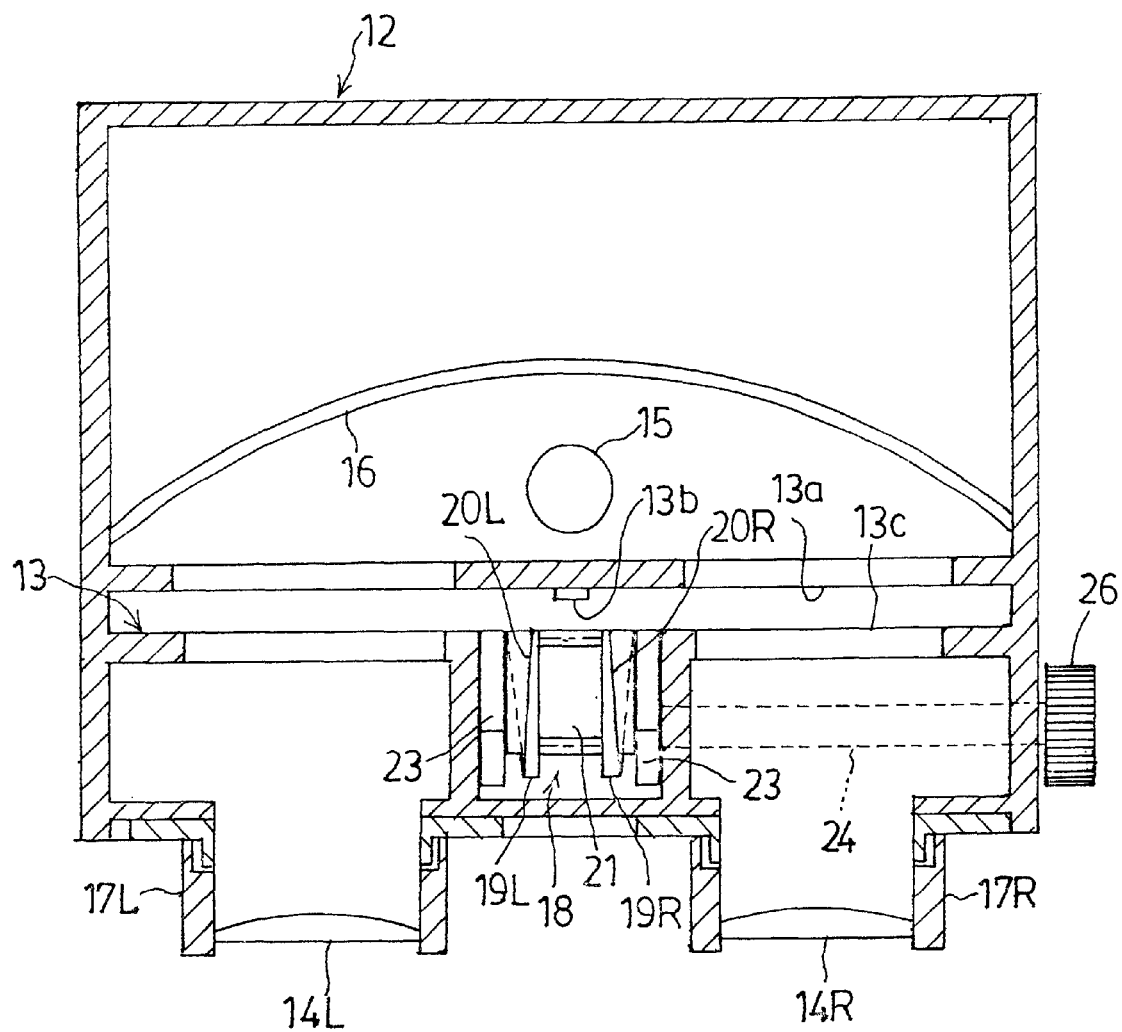
FIG. 9 is a partly cut-away plan view of a stereo slide viewer according to a prior art.
Figure 10:
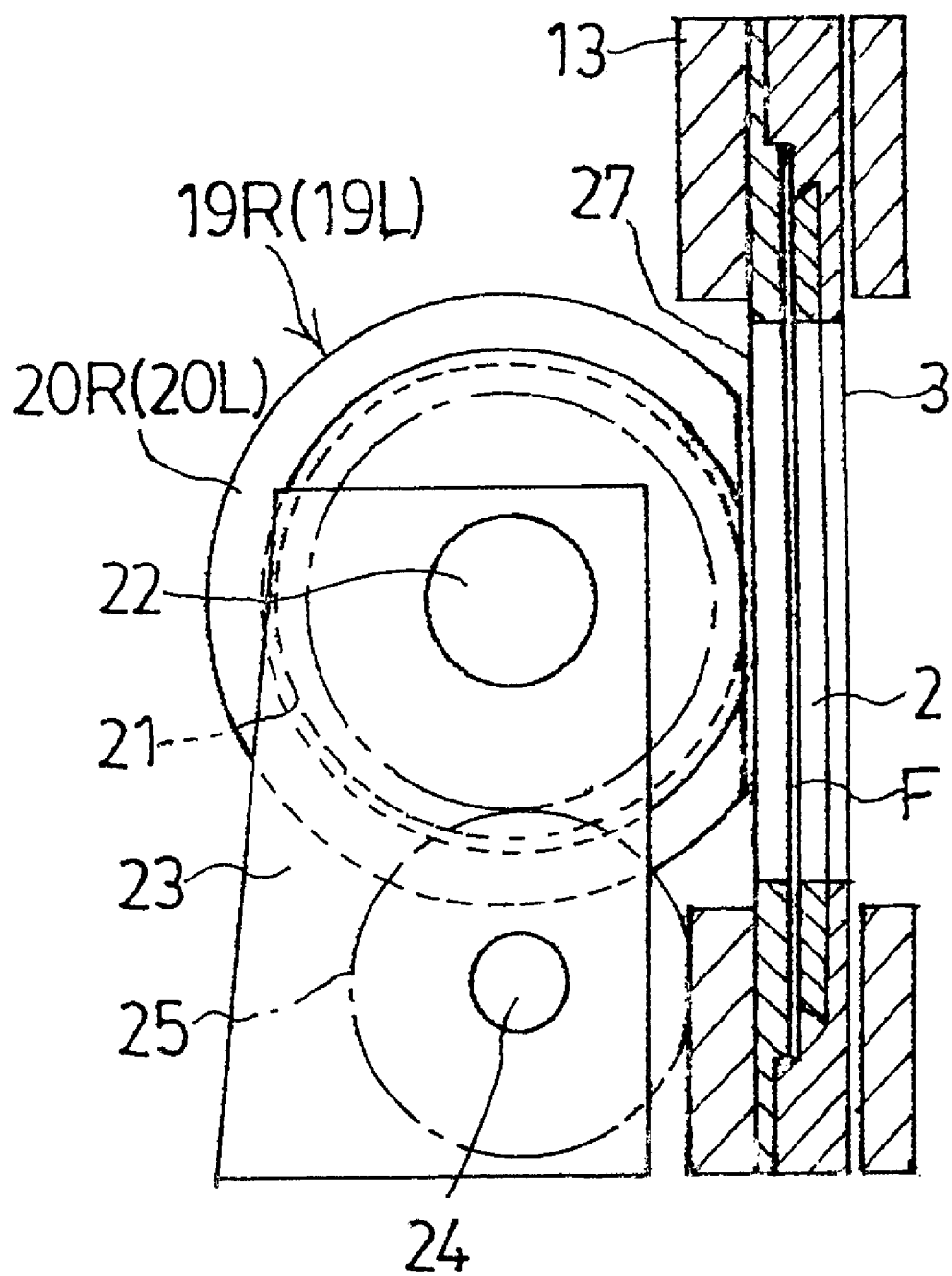
FIG. 10 is a side view of a film pitch-adjusting device in the stereo slide viewer according to the prior art.
Figure 11:
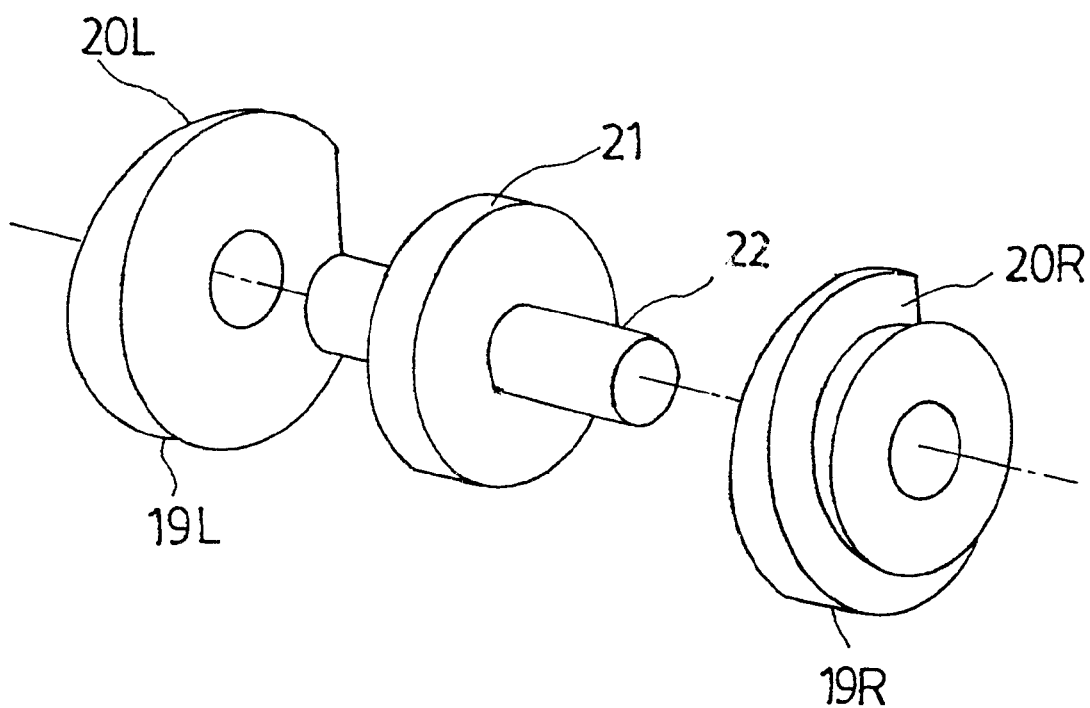
FIG. 11 is a perspective view of a helical cam according to the prior art.
Figures 12A, 12B:
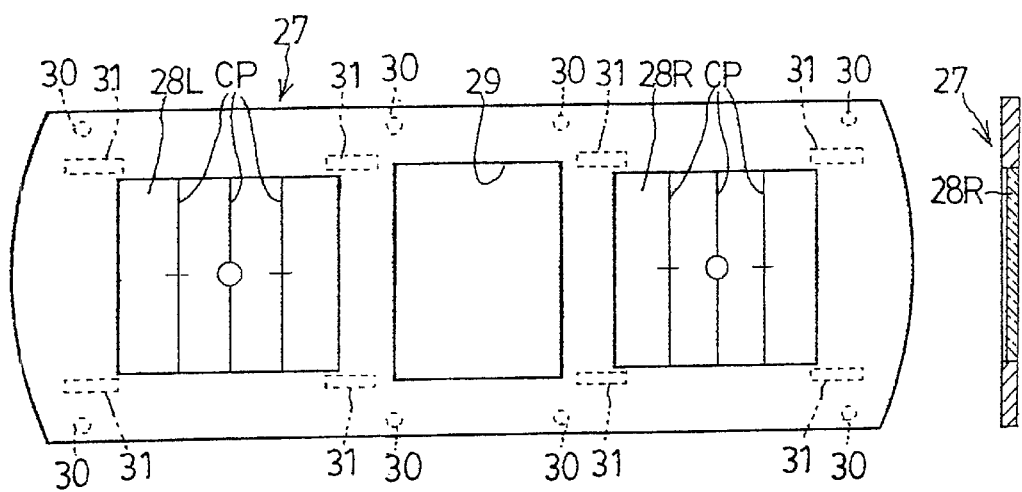
FIG. 12(a) is a front view of a collimation pattern mask according to the prior art.
FIG. 12(b) is a side sectional view of the collimation pattern mask according to the prior art.
Figure 13:
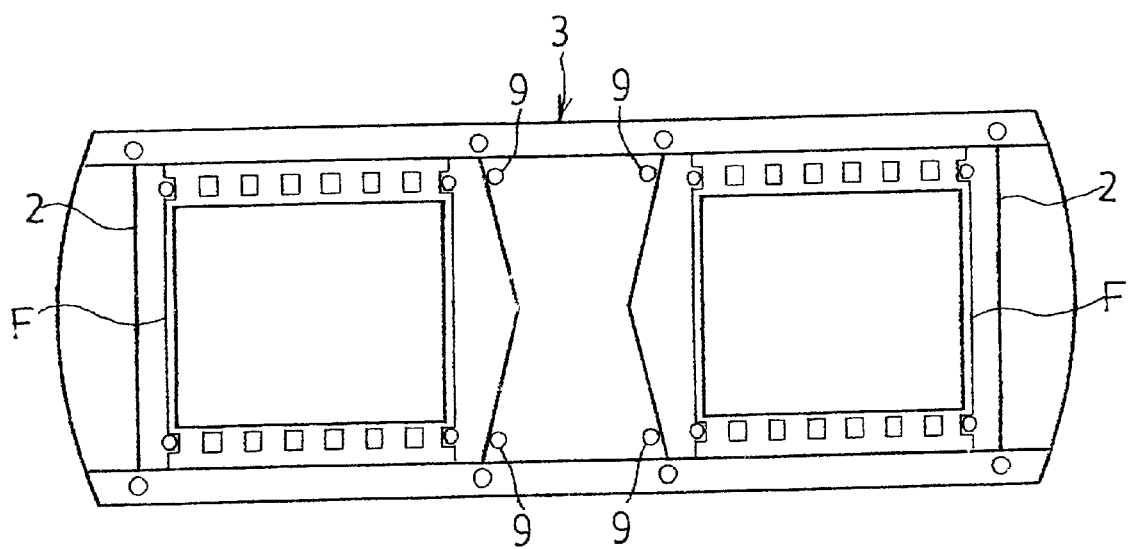
FIG. 13 is a front view illustrating a state where the film holders and the films are mounted on the base frame according to the prior art.
Figure 14:
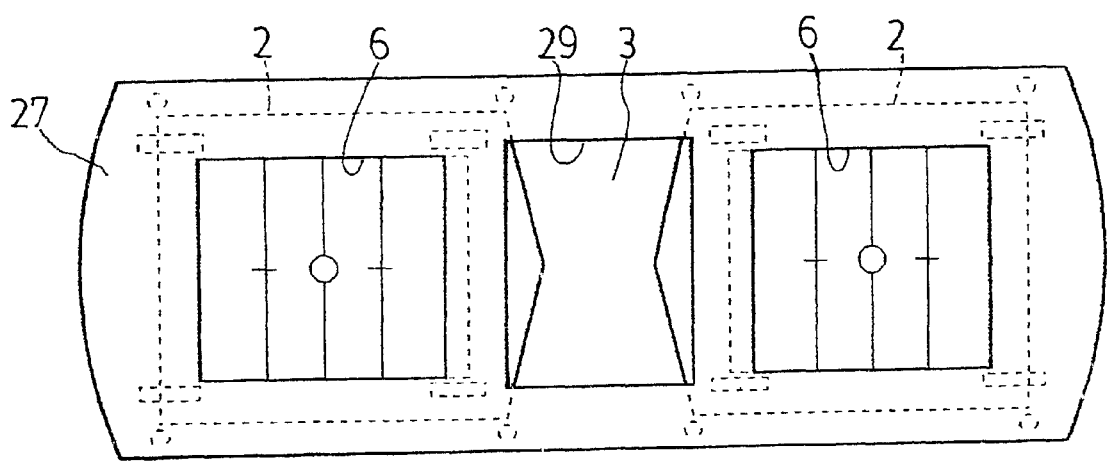
FIG. 14 is a front view illustrating a state where the film holders, the films and the collimation pattern mask are mounted on the base frame according to the prior art.

In FIG. 3, reference numeral 34 denotes a stereo slide viewer. A film pitch-adjusting device 35 disposed in the stereo slide viewer 34 is provided with worm 36R and 36L forming helical engaging portions having an equal tooth width and maintaining nearly one pitch as shown in FIG. 4 instead of helical cams (19R and 19L in FIG. 9) of the prior art. The worm 36R and 36L have a D-shape in cross section with their outer peripheral surfaces partly cut straight, but may also have the shape of a disk without being cut.

Tooth tips 37R and 37L of the worm 36R and 36L are inserted in the recessed grooves 33 and 33 of the film holders 32 and 32. As the worm 36R and 36L rotate, the film holders 32 and 32 slide in a direction to approach each other or in a direction to separate away from each other, enabling the film pitch to be adjusted.

Figure 5:
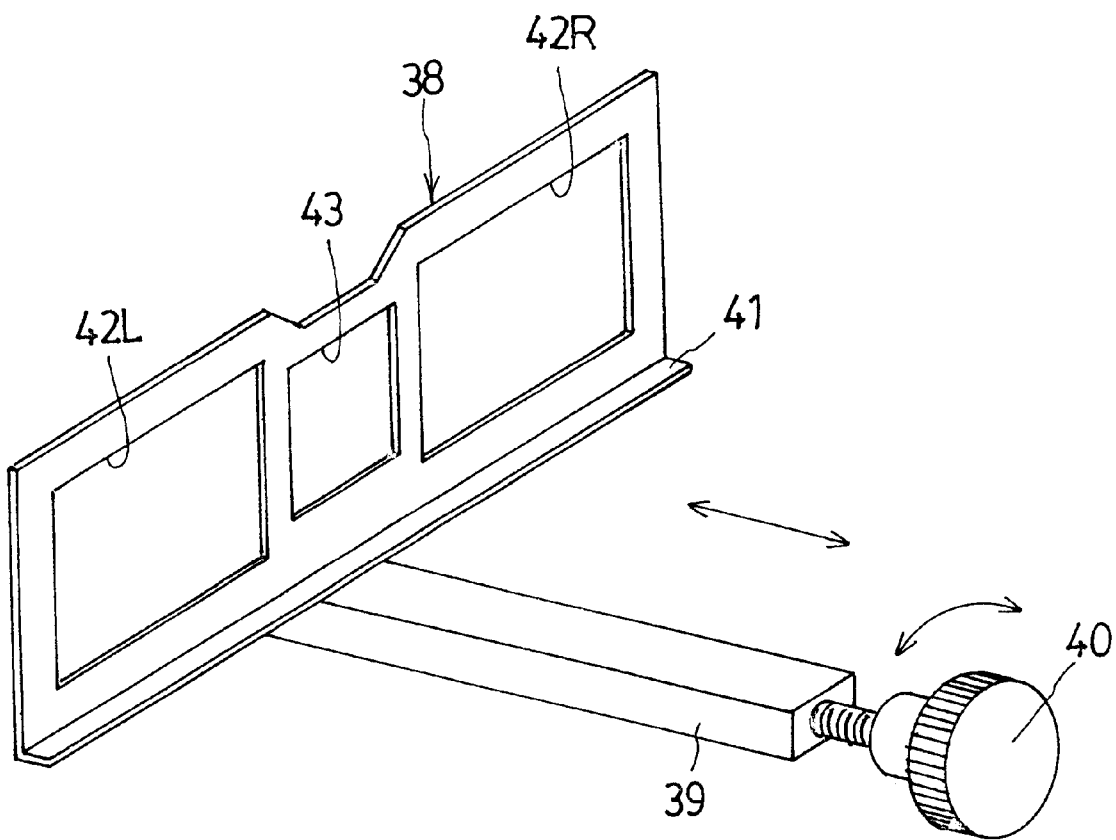
FIG. 5 is a perspective view illustrating a mount holder plate according to an embodiment of the present invention.

In FIG. 3, further, reference 38 denotes a mount holder plate which is provided to freely slide back and forth in the slide mount holder unit 13 of the stereo slide viewer 34. Referring to FIG. 5, the mount holder plate 38 is secured to an end of a guide bar 39 at right angles thereto, and slides back and forth upon the manipulation of a knob 40 provided at the other end of the guide bar 39.

Figures 8A, 8B:
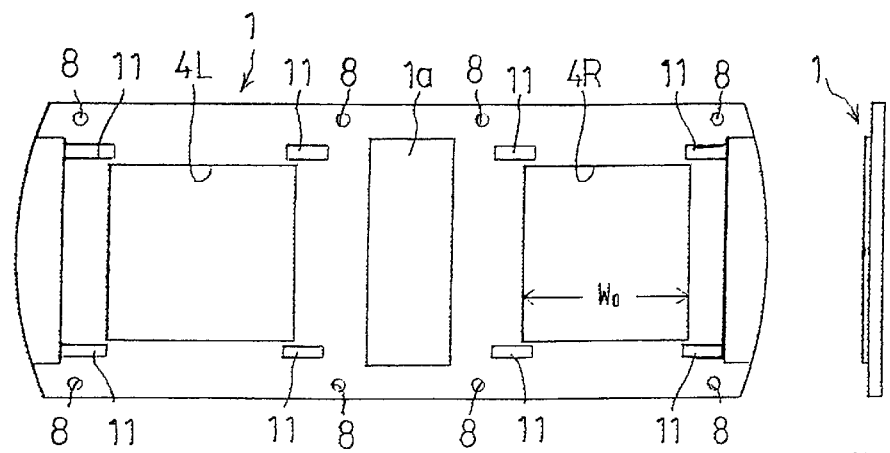
FIGS. 8(a–g) illustrates a conventional stereo slide mount, wherein the diagram 8(a) is a back view of a cover frame, the diagram 8(b) is a side view of the cover frame, the diagrams 8(c) and 8(d) are front views of film holders, the diagram 8(e) is side view of the film holder, the diagram 8(f) is a front view of a base frame, and the diagram 8(g) is a side view of the base frame.
Figures 8C, 8D, 8E:
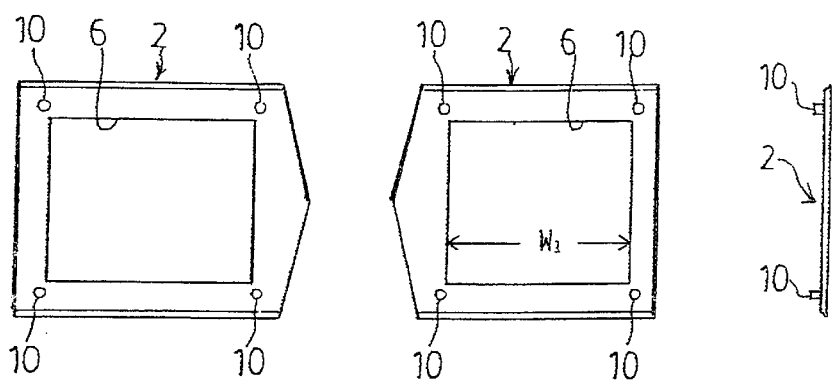
Figures 8F, 8G:
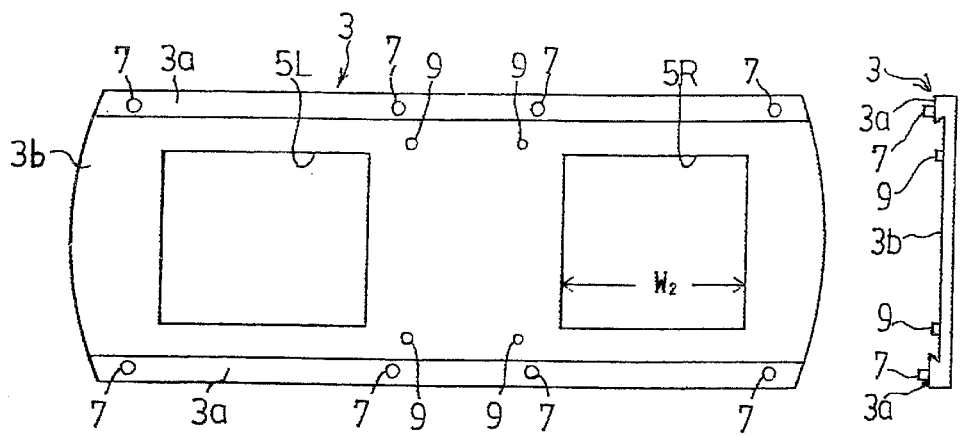

The mount holder plate 38 is folded at its lower end to form a folded portion 41 for supporting the stereo slide mount, has right and left windows 42R and 42L like the cover frame 1 in FIG. 8(a,b) of the prior art, and has an opening 42 in an intermediate portion between the right window 42R and the left window 42L.

Next, described below is a procedure of operation for mounting the films and for adjusting the film pitch.

Figure 6:
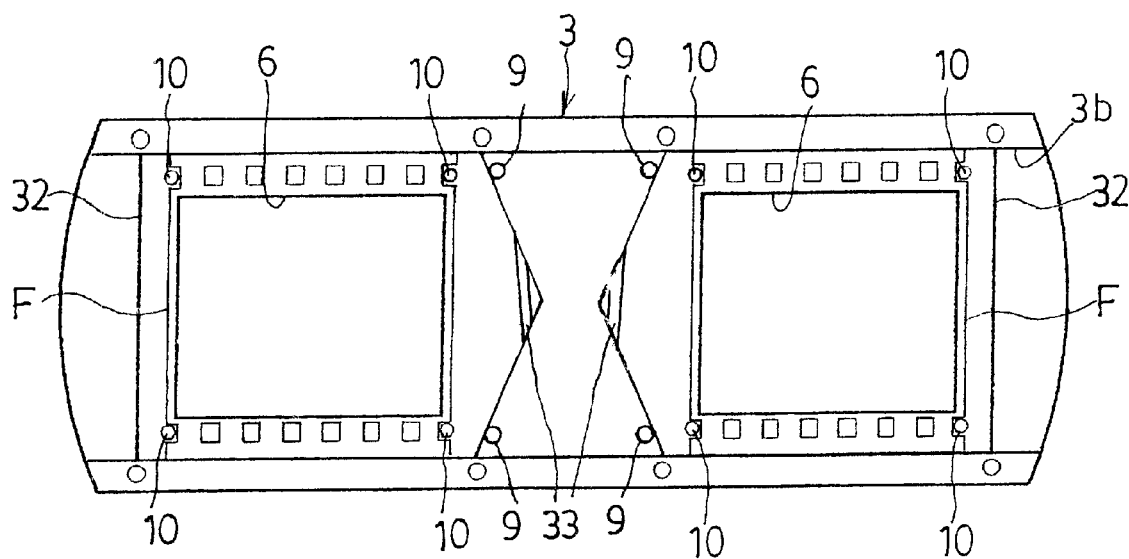
FIG. 6 is a front view illustrating a state where the film holders and the films are mounted on a base frame according to an embodiment of the present invention.
Figure 7:
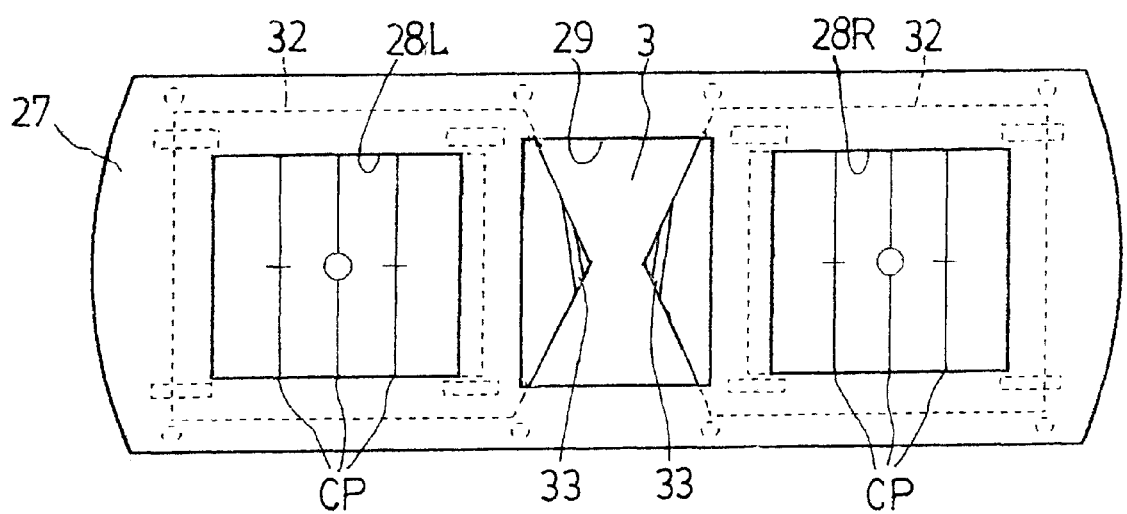
FIG. 7 is a front view illustrating a state where the film holders, the films and collimation pattern masks are mounted on the base frame according to an embodiment of the present invention.

1. Referring to FIG. 6, two pieces of right and left film holders 32 are mounted on the base frame 3, are brought to the positions where they become closest to each other, and films F are mounted on the film holders 32.
2. Referring next to FIG. 7, the collimation pattern mask 27 is attached to the base frame 3.
3. Then, the knob 40 shown in FIG. 5 is turned to slide the mount holder plate 38 in a direction to separate away from the rear wall surface 13c of the slide mount holder portion 13 in FIG. 3. Thereafter, the base frame 3 mounting the collimation pattern mask 27 is held by the mount holder plate 38. Here, the worm 36R and 36L are returned back to their initial positions.
4. The knob 40 is turned to bring the mount holder plate 38 into contact with the rear wall surface 13c. Then, the knob 26 is turned so that the tooth tips 37R and 37L of the worm 36R and 36L enters into the recessed grooves 33 of the film holders 32. A perspective feeling of a picture to the images of collimation patterns CP of the collimation pattern mask 27 is observed in a three-dimensional view through the eyepieces 14R and 14L of the stereo slide viewer 34. Here, when the picture is seen in flush with the collimation patterns CP or at the back of the collimation patterns CP, the film pitch of the stereo slide mount is proper and needs not be adjusted.

5. When the film pitch is not proper, the knob 26 of the stereo slide viewer 34 is turned to adjust the film pitch. When the knob 26 is turned in the clockwise direction, the worm 36R and 36L cause the gap between the right and left film holders 32 to increase. In this case, the outer edges of the pictures of the films are masked over increased areas by the edges of the windows 28R and 28L of the collimation pattern mask 27, and the distance of the three-dimensional picture moves back away beyond the images of the collimation patterns CP. An optimum film pitch is accomplished when the three-dimensional picture is seen in flush with the collimation patterns CP or at the back of the collimation patterns CP.

6. When the film pitch being adjusted becomes too large passing over the optimum pitch and the three-dimensional picture is seen at a very distance beyond the collimation patterns CP. the film pitch is adjusted again. That is, when the knob 26 is turned reverse, the gap between the right and left film holders 32 becomes small due to the worm wheels 36R and 36L. Thus, the knob 26 is turned clockwise and counterclockwise, and this operation is repeated as required, so that the film is adjusted to an optimum state.

7. After the pitch has been adjusted, the knob 40 is turned to slide the mount holder plate 38 in a direction to separate away from the rear wall surface 13c, and the film holders 32 are separated away and are disengaged from the worm 36R and 36L.

8. The stereo slide mount is taken out from the stereo slide viewer 34, the collimation pattern mask 27 is removed from the base frame 3 and, instead, the cover frame 1 is mounted on the base frame 3 to complete a stereo slide mount of an optimum film pitch.

9. Further, the knob 26 is turned to return the worm 36R and 36L back to the initial positions.

10. The completed stereo slide mount is held by the mount holder plate 38 of the stereo slide viewer 34. The mount holder plate 38 is then brought into contact with the rear wall surface 13c again and is appreciated. Even when the knob 26 is turned during the appreciation, the film holders 32 have been shielded by the cover frame 1 and, hence, the worm 34R and 34L do not come in contact with the film holders 32, and the film pitch does not change.

During the appreciation, it is also allowable separate the mount holder plate 38 away from the rear wall surface 13c, so that the worm 36R and 36L will not come in contact with the stereo slide mount. In this case, the stereo slide mount can be freely attached or detached offering an advantage accompanied, however, by a problem in that the eyepieces 14R and 14L must be adjusted permitting light to enter from the outer side unexpectedly.

In the above-mentioned stereo slide mount and stereo slide viewer, further, it is also allowable to form helical grooves instead of the worm 36R and 36L, and to provide the film holders 32 with protuberances that engage with the grooves. In this case, too, there can be obtained the same effects as those of the above-mentioned stereo slide mount and the stereo slide viewer.

The present invention can be modified in a variety of ways without departing from the spirit and scope of the invention, and it should be noted that the modified embodiments are also encompassed by the present invention as a matter of course.

According to the embodiment of the invention as described above in detail, recessed grooves that serve as meshing portions are symmetrically formed in an inclined manner, recessed grooves of the shape of a character X or of the shape of a hyperbola are formed, or a pair of protuberances are formed maintaining a predetermined gap on the surfaces near the opposing ends of said pair of right and left film holders so as to come in mesh with helical engaging portions of a film pitch-adjusting device provided in a stereo slide viewer.

In the stereo slide viewer, further, the film pitch-adjusting device has worm as a pair of helical engaging portions in a right-and-left symmetrical manner, and the slide mount holder unit is provided with a mount holder plate that freely slides back and forth holding the stereo slide mount.

The meshing portions slide being engaged with the helical engaging portions and, hence, the pair of right and left film holders can be freely adjusted in a direction of separation or in a direction of approach. Upon sliding the mount holder plate, further, the meshing portions can be disengaged from the helical engaging portions. Thus, the film holder can be adjusted in the direction of separation and in the direction of approach by the film pitch-adjusting device in the stereo slide viewer, enhancing the operability for adjusting the pitch.

In the stereo slide mount and the stereo slide viewer, further, helical grooves may be formed as the helical engaging portions, and the film holders may be provided with protuberances that engage with the grooves. In this case, too, distinguished effects are obtained like those of the above-mentioned stereo slide mount and the stereo slide viewer.

What is claimed is:

1. A stereo slide mount in which a guide groove extending in the right-and-left direction is formed in the surface of a base frame in which right and left windows are formed, a pair of right and left film holders, each having a window and an engaging portion for engagement with the film, is provided in said guide groove to freely slide therein, and a cover frame having right and left windows formed therein is detachably attached to said base frame to hold said film holders, wherein meshing portions are symmetrically formed on the surfaces near the opposing ends of said pair of right and left film holders so as to come in mesh with helical engaging portions of a film pitch-adjusting device provided in a stereo slide viewer.

2. A stereo slide mount according to claim 1, wherein the meshing portions formed on the pair of right and left film holders are protuberances formed in a protruded manner on the surfaces of the film holders.

3. A stereo slide mount according to claim 1, wherein the meshing portions formed on the pair of right and left film holders are a pair of protuberances formed in a protruded manner on the surfaces of the film holders maintaining a predetermined gap.

4. A stereo slide mount in which a guide groove extending in the right-and-left direction is formed in the surface of a base frame in which right and left windows are formed, a pair of right and left film holders, each having a window and an engaging portion for engagement with the film, is provided in said guide groove to freely slide therein, and a cover frame having right and left windows formed therein is detachably attached to said base frame to hold said film holders, wherein meshing portions are symmetrically formed on the surfaces near the opposing ends of said pair of right and left film holders so as to come in mesh with helical engaging portions of a film pitch-adjusting device provided in a stereo slide viewer, wherein the meshing portions formed on the pair of right and left film holders are recessed grooves that are symmetrically provided in an inclined manner.

5. A stereo slide mount in which a guide groove extending in the right-and-left direction is formed in the surface of a base frame in which right and left windows are formed, a pair of right and left film holders, each having a window and an engaging portion for engagement with the film, is provided in said guide groove to freely slide therein, and a cover frame having right and left windows formed therein is detachably attached to said base frame to hold said film holders, wherein meshing portions are symmetrically formed on the surfaces near the opposing ends of said pair of right and left film holders so as to come in mesh with helical engaging portions of a film pitch-adjusting device provided in a stereo slide viewer, wherein the meshing portions formed on the pair of right and left film holders are recessed grooves that are formed in the shape of a hyperbola.

6. A stereo slide mount in which a guide groove extending in the right-and-left direction is formed in the surface of a base frame in which right and left windows are formed, a pair of right and left film holders, each having a window and an engaging portion for engagement with the film, is provided in said guide groove to freely slide therein, and a cover frame having right and left windows formed therein is detachably attached to said base frame to hold said film holders, wherein meshing portions are symmetrically formed on the surfaces near the opposing ends of said pair of right and left film holders so as to come in mesh with helical engaging portions of a film pitch-adjusting device provided in a stereo slide viewer, wherein the meshing portions formed on the pair of right and left film holders are recessed grooves that are formed in the shape of a character X.

7. A stereo slide viewer comprising right and left eyepieces and a slide mount holder unit for loading a stereo slide mount, wherein a film pitch-adjusting device is provided at an intermediate portion between the right and left eyepieces of the stereo slide viewer but outside the visual fields of the right and left eyepieces for adjusting the gap between a pair of right and left film holders having meshing portions symmetrically formed on surfaces near opposing ends in said stereo slide mount, said film pitch-adjusting device having a pair of helical engaging portions in a right-and-left symmetrical manner so as to mesh with the meshing portions of the pair of right and left film holders.

8. A stereo slide viewer according to claim 7, wherein the helical engaging portions are worm gears.

9. A stereo slide viewer according to claim 7, wherein the helical engaging portions are helical grooves.

10. A stereo slide viewer comprising right and left eyepieces and a slide mount holder unit for loading a stereo slide mount, wherein a film pitch-adjusting device is provided at an intermediate portion between the right and left eyepieces of the stereo slide viewer but outside the visual fields of the right and left eyepieces for adjusting the gap between a pair of right and left film holders in said stereo slide mount, said slide mount holder unit being provided with a mount holder plate that freely slides back and forth holding the stereo slide mount permitting the pair of right and left film holders to engage and disengage said film pitch-adjusting device.

\* \* \* \* \*